J. KEITH.
Assignor to H. G. THOMPSON.
MACHINE FOR MAKING AND SETTING BLIND-STAPLES.
No. 7,516. Reissued Feb. 20, 1877.
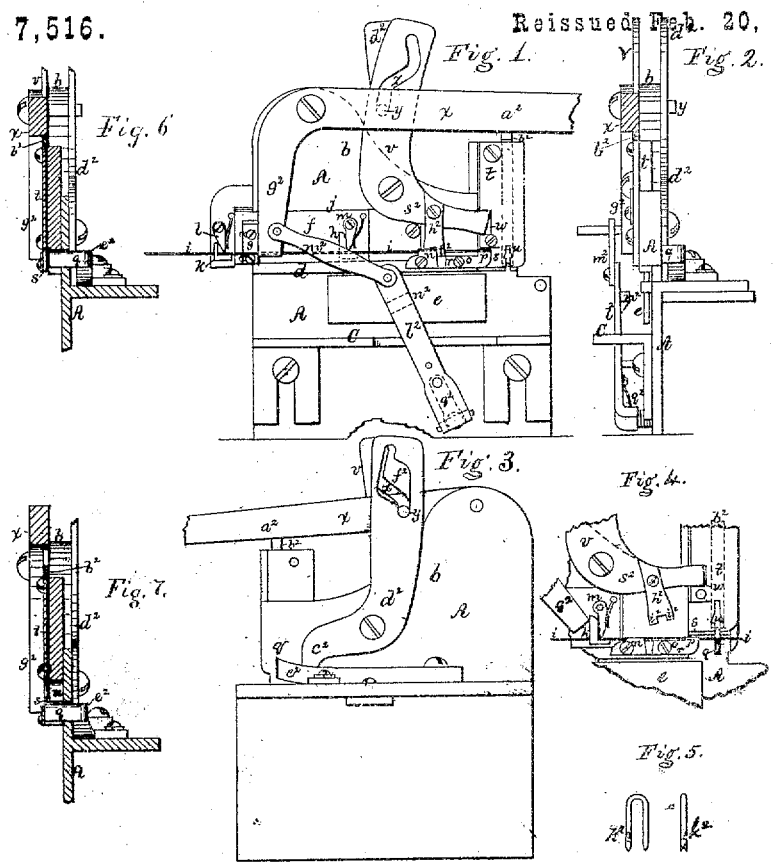
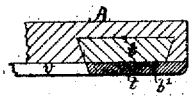
Fig. 8.
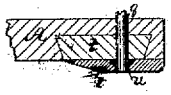
Fig. 9.
Witnesses
Chas. L. Steere
Albert H. Bean
Jeremiah Keith.

UNITED STATES PATENT OFFICE

JEREMIAH KEITH, OF PROVIDENCE, RHODE ISLAND, ASSIGNOR TO HENRY G. THOMPSON.

IMPROVEMENT IN MACHINES FOR MAKING AND SETTING BLIND-STAPLES.

Specification forming part of Letters Patent No. 112,719, dated March 14, 1871; reissue No. 7,094, dated May 2, 1876; reissue No. 7,516, dated February 20, 1877; application filed December 13, 1876.

*To all whom it may concern:*

Be it known that I, JEREMIAH KEITH, formerly of Charlton, in the county of Worcester and State of Massachusetts, but now of Providence, in the State of Rhode Island, have invented an Improvement in Machines for Making and Setting Blind-Staples; and I do hereby declare that the following, taken in connection with the drawing which accompanies and forms part of this specification, is a description of the invention sufficient to enable those skilled in the art to make and use it.

This invention relates to a new construction or organization of machines for forming and driving staples, the invention consisting in certain new parts and combinations of mechanisms hereinafter described.

The drawing represents a machine embodying the invention.

Figure 1 shows the mechanism in front elevation. Fig. 2 is an end view of it. Fig. 3 is a rear elevation. The other figures show details.

A denotes the bed or frame, which, in connection with an upright, *b*, supports the mechanism. C is a vertically-adjustable table, upon which the slat or rod to be stapled is placed, the lower edge resting on this table, and the upper edge extending under a shoulder, *d*, the back of the slat being supported against a vertical face, *e*. The top of the shoulder *d* and another shoulder, *j*, form ways in which travels a reciprocating slide, *f*, on the front and near the opposite ends of which are two plates, *g h*, in each of which is a horizontal hole for the passage of the staple-forming wire *i*, said wire entering the machine through a stationary eye-piece, *k*, and passing under a spring-stop, *l*, which permits the wire to be drawn forward, but prevents its slipping back.

The wire passes under a spring-feeder, *m*, on the slide *f*; and as the slide moves forward this feeder is cramped down upon the wire and draws it forward with it, the projecting end of the wire extending through a guide-eye, *n*, over a ledge or bed, *o*, through a guide-eye, *p*, and over a beak or anvil, *q*, the guide-eyes being formed in a plate, *r*, fastened upon the front of the upright *b*. The inner face of the plate *r*, at its front end, is inclined, and the guide eye *p* leads out to such face. Over the inner face of the plate *r* is a cutting-edge, *s*, on the bottom of a vertically-sliding bender-plate, *t*, the cutting-edge being the converse of the inner face of the plate *r*, and so that, as it descends, it strikes the wire at the end of the eye *p*, and clips it off, cutting it on an angle, and thereby pointing it.

Before, or just as the cutter reaches the wire, (in the descent of the bender-plate *t*,) the bottom of the plate strikes the wire over the top of the beak *q*. The bottom of the bender-plate *t* has a vertical slot, *u*, of a width exceeding the thickness of the beak *q*; and as the plate moves down it bends the opposite ends of the wire over the beak *q*, and down against its sides, and thereby forms the wire into a staple, the end of the wire projecting beyond the beak being of the length to form one of the staple legs, and the length of wire from the beak to the mouth of the eye *p* being the same, and forming the other leg. Fig. 9 is a section through the bender-plate *t*, near its end, showing the slot *u* over the beak *q*. This slot is made near the end of the channel in the plate *t*, in which the driver $b^2$ reciprocates; and this channel and slot together form spaces in the plate *t* for the legs of the staple. This channel in plate *t* is occupied by the driver $b^2$ as the staple is driven.

When the staple is thus formed its two points are just above the edge of the slat to be stapled, and the bottom of the bender-plate descends against the slat and holds it. The vertical movement of the bender is effected by a lever, *v*, one arm of which extends into a slot, *w*, in the bender-plate, and this lever is actuated by another lever, *x*, a pin, *y*, from one arm of which extends into a bent slot, *z*, in the lever *v*.

After the lever-arm $a^2$ has effected the movement of the bender-plate down upon the slat, the arm still further descends, but without imparting movement to the bender, and strikes the head of a driver, $b^2$. The bottom of the driver (which moves in the channel in the lower end of which the staple is formed)

is in line with the formed staple, and over the beak, and just before the lever drives down the driver $b^2$ an incline, $c^2$, at the lower end of a lever, $d^2$, is forced in between an arm, $e^2$, (from the end of which projects the beak $q$,) and the upright $b$, and presses said beak back from under the staple out of the path of movement of the driver, the upper arm of the lever $d^2$ having a cam-slot, $f^2$, into which projects the pin $y$, the pin striking one incline of the slot as it moves down, and thereby causing the lower end of the lever to force back the beak. When the pin rises it strikes another incline of the slot, and throws up the lower end of the lever, freeing the beak-arm, which is then pressed forward again by a suitable spring. The beak having been thrown back, the driver descends upon the staple and forces it into the slat.

When the next staple is formed by the descent of the bender, the driver gives way as the bender descends, the driver having been carried up by the bender as the bender rises for its next stroke.

The carrier or slide $f$ is moved forward by the lower arm $g^2$ of the lever $x$, the forward movement of this arm causing it to strike the plate $h$ and move the slide, and with it the wire, this movement taking place just after the same movement of the lever $x$ has effected the rise of the cutter, bender, and driver, and the forward movement of the beak, leaving these parts in position to receive the advancing end of the wire.

When the wire is being cut and formed by the descent of the upper arm of lever $x$, the arm $g^2$ moves back, striking the plate $g$, and returns the carrier-slide to its normal position, the feeder $m$ yielding and allowing the plates $g$ $h$ to slip upon the wire, the stop $l$ holding the wire stationary during the back movement of the carrier-plate.

Fixed to the lever-arm $s^2$ is a cutter-stock, $h^2$, having at its bottom end two cutters, $i^2$, and just as the arm is completing its descent these cutters strike the opposite sides of the wire, cutting upon each side a nick, $k^2$, as seen at Fig. 5, the wire being subsequently cut off between the two nicks, so that a nick is formed upon one end of one staple and one end of another by each action of the cutters. The metal displaced in cutting each nick forms a barb, which helps to confine the staple to the slat.

When the slat-rod is to have the staple applied to it the table C is raised and fastened in position, to enable the slat-rod to be properly supported and presented to the action of the staple-driving mechanism.

To feed the rod a rocker-arm, $l^2$, may be connected by a link, $m^2$, to the lower arm $g^2$, and a projection, $n^2$, upon this arm in its forward movement strikes one of a series of teeth on a strip or rack fastened to the rod.

When the slats are being stapled, the link is unjointed from the lever, and the rocker-arm may then act as a presser to keep the slat up to the face $e$, for which purpose it is provided with a spring, $q^2$, the stress of which throws the arm inward.

Fig. 4 in the drawing shows the bender-plate at its highest position, with the mechanism adjacent thereto.

Figs. 6 and 7 are sectional views, one with the parts in the position shown in Fig. 1, and the other with the parts shown in Fig. 4.

Figs. 8 and 9 are cross-sections of the bender-plate $t$ and its ways, Fig. 8 being a section above the slot $u$, and Fig. 9 a section through the slot $u$.

Having thus fully described this improvement in machines for making and setting blind and other staples as of my invention, I claim—

1. In combination with the supporting-table C, the sliding and feeding carrier plate $f$, the bender-plate or fork $t$, provided with a cutting-edge, $s$, and the driving-rod $b^2$, all combined and arranged to operate substantially as hereinbefore set forth.

2. In combination with the mechanism for cutting, forming, and driving the wire staples, the cutters $i^2$, whereby the wire is nicked, substantially in the manner and for the purpose hereinbefore set forth.

3. The bender-plate $t$, having a longitudinal opening for the driver $b^2$, and a slot, $u$, for the beak $q$, as and for the purposes specified.

4. The combination of the bender-plate $t$, the driver $b^2$ working within it, and the beak $q$, the beak leaving the staple as the driver operates, all substantially as described.

5. The combination of the bender-plate $t$, driver $b^2$, beak $q$, and mechanism, substantially such as is described, for pressing the bender-plate upon the material to be stapled, and holding it there while the hammer operates, the whole combination being and operating substantially as described.

6. In combination, the wire-feeding mechanism, the staple-forming mechanism, and the staple-driving mechanism, substantially as described, the driver $b^2$ being arranged with relation to the staple-forming mechanism, as and for the purposes specified.

7. In combination, the levers $v$ and $x$, pin $y$, bent slot $z$, and bender-plate $t$, substantially as described.

8. In combination with the feeding, cutting, bending, and driving mechanism hereinbefore described, the driver $b^2$ and link $m^2$, for effecting the feed movement of a slat-rod, substantially as set forth.

9. In combination with the staple forming and driving mechanism hereinbefore described, the die-plate or cutter $r$, whereby both ends of the staple are pointed at any desired angle, substantially as set forth.

JEREMIAH KEITH.

Witnesses:
CHAS. L. STEERE,
ALBERT D. BEAN.